(12) United States Patent
Kovacs

(10) Patent No.: US 7,400,432 B2
(45) Date of Patent: Jul. 15, 2008

(54) SCANNING-MIRROR STRUCTURE HAVING A CUT OR A COMPOSITE DESIGN TO REDUCE DEFORMATION OF THE MIRROR FACE, AND RELATED SYSTEM AND METHOD

(75) Inventor: Sandor L. Kovacs, Kirkland, WA (US)

(73) Assignee: Microvision, Inc., Redmond, WA (US)

( * ) Notice: Subject to any disclaimer, the term of this patent is extended or adjusted under 35 U.S.C. 154(b) by 1145 days.

(21) Appl. No.: 10/150,408

(22) Filed: May 17, 2002

(65) Prior Publication Data

US 2003/0214460 A1    Nov. 20, 2003

(51) Int. Cl.
G02B 26/08    (2006.01)
(52) U.S. Cl. ....................... 359/224; 359/848
(58) Field of Classification Search ................. 359/224
See application file for complete search history.

(56) References Cited
U.S. PATENT DOCUMENTS 6,919,980 B2 *  7/2005  Miyajima et al. ........... 359/224

2002/0012180 A1 *  1/2002  Yu et al. ..................... 359/872

* cited by examiner

*Primary Examiner*—James Phan
(74) *Attorney, Agent, or Firm*—Kevin D. Wills

(57) ABSTRACT

A mirror structure includes a mirror, a reflective face, a cut in the mirror under the face, and a torsion arm attached to the mirror. Such a mirror structure often distorts a scanned image less than prior mirror structures because the cut uncouples the twist-induced strain in the torsion arm from the mirror face, and thus reduces the level of deformation that this strain imparts to the mirror face. Another mirror structure includes a base formed from a first material, a mirror attached to the base and formed from a second material, and a torsion arm attached to the base. Such a composite mirror structure often distorts a scanned image less than prior mirror structures because it reduces the acceleration-induced bending of the mirror and/or the twist-induced strain in the torsion arm, and thus reduces the level of deformation that this bending and/or strain impart to the mirror face.

9 Claims, 7 Drawing Sheets

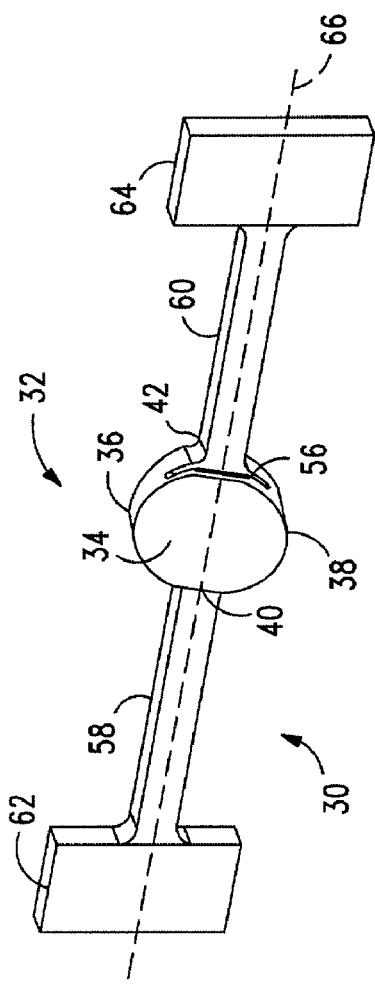
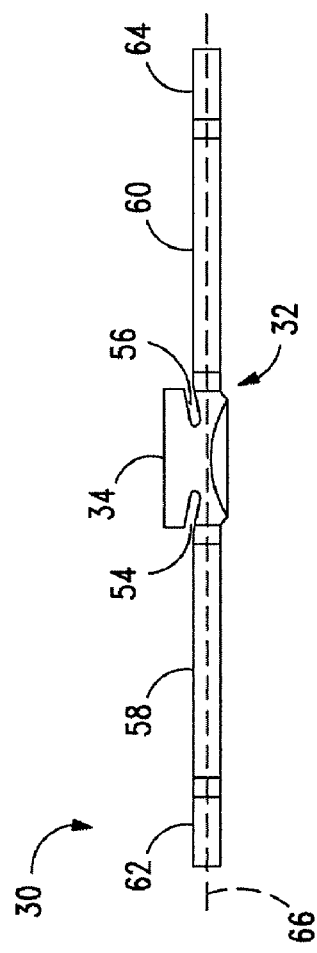
FIG. 2
FIG. 3

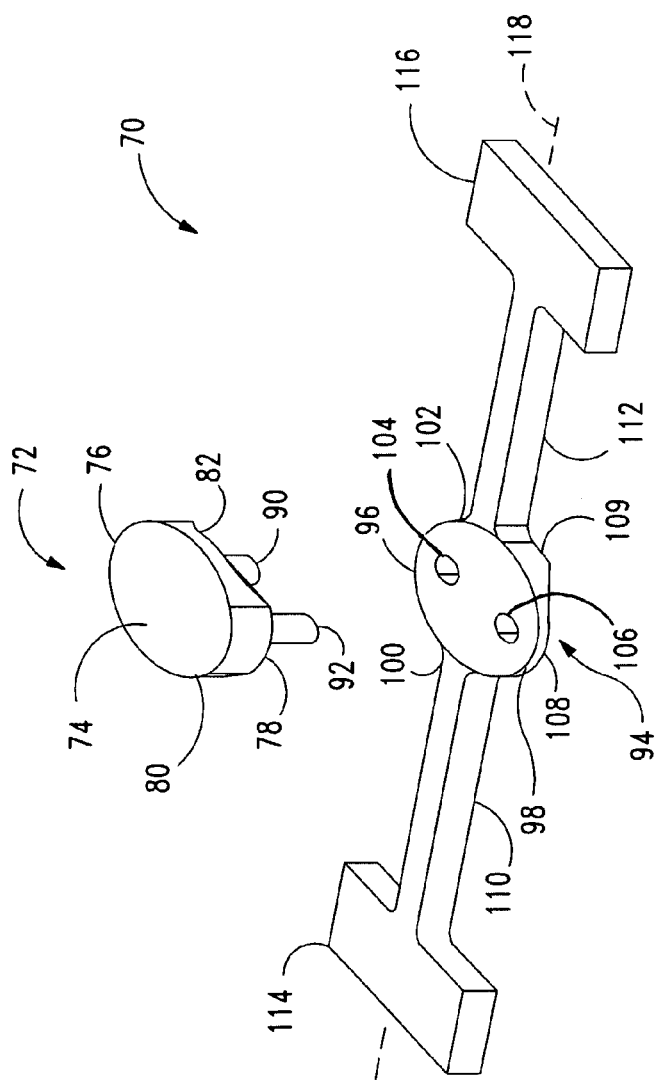
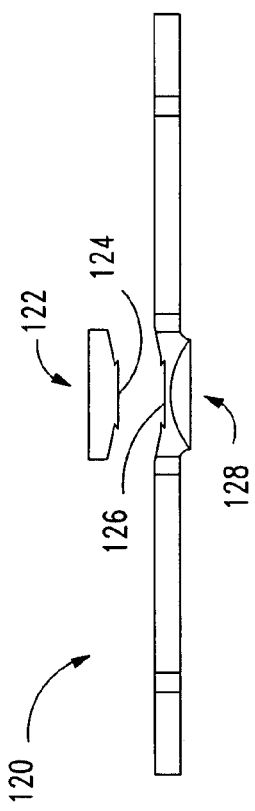
FIG. 8
FIG. 9

SCANNING-MIRROR STRUCTURE HAVING A CUT OR A COMPOSITE DESIGN TO REDUCE DEFORMATION OF THE MIRROR FACE, AND RELATED SYSTEM AND METHOD

STATEMENT REGARDING GOVERNMENT AGENCY CONTRACT

The present invention was first conceived, reduced to practice, and/or built and tested in the course of work under U.S. Government Contract Number DAAH10-99-C-0034. The U.S. Government has certain rights in the invention.

BACKGROUND OF THE INVENTION

A head-mounted display, often called a virtual retinal display (VRD), projects an image directly onto the retinas of a viewer's eyes. For example, a VRD may project a transparent image of a flight-instrument panel into a fighter pilot's eyes such that he can see the flight instruments regardless of his viewing direction. Thus, the VRD eliminates the need for the pilot to shift his gaze back and forth between the instrument panel and the view through the windshield.

A VRD typically includes at least one oscillating mirror—often called a micro-electromechanical mirror (MEM)—that scans the image into the viewer's eyes. Typically, the VRD directs an image beam, which is typically a modulated light beam, onto the mirror's reflective face, which directs the beam into one of the viewer's eyes. By oscillating back and forth through a range of horizontal and vertical sweep positions, the mirror sweeps the beam through a raster pattern to scan the image. Alternatively, the VRD may include two oscillating mirrors, one for sweeping the beam in a horizontal-scanning direction and the other for sweeping the beam in a vertical-scanning direction. To scan the image into the viewer's other eye, the VRD may direct a second, identical image beam onto another mirror or pair of mirrors. Alternatively, the VRD may include an optical assembly that splits the swept image beam into a pair of swept beams, one for each eye.

Unfortunately, as discussed below in conjunction with FIG. 1, the forces placed on the mirror while it oscillates may cause the mirror to distort the scanned image to a noticeable and undesirable degree.

FIG. 1 is a view of a conventional scanning-mirror structure 10, which includes a mirror 12 for sweeping an image beam 14 into a viewer's eye (not shown in FIG. 1). In addition to the mirror 12, the structure 10 includes torsion arms 16 and 18 and mounting flanges 20 and 22. The mirror 12 includes a face 24 for reflecting the beam 14 into the viewer's eye. Typically, the mirror 12, torsion arms 16 and 18, and flanges 20 and 22 are formed as an integral unit, and the face 24 is polished and treated with a reflective optical coating.

In operation, the mirror 12 sweeps the image beam 14 in a horizontal-scanning direction by oscillating about an axis 26. Typically, the mirror structure 10 is formed from a magnetic material such as steel and is magnetized, and the flanges 20 and 22 are mounted such that they remain stationary as the mirror 12 oscillates. A conductive coil (not shown in FIG. 1) located near the mirror 12 generates a sinusoidal magnetic field that causes the mirror to rock back and forth about the axis 26 as indicated by the arrows. By setting the frequency of the magnetic field at or near the frequency at which the mirror 12 resonates about the axis 26, one can sweep the beam 14 very efficiently, i.e., with minimum power dissipation in the coil.

Unfortunately, as discussed above, the forces placed on the mirror structure 10 as the mirror 12 oscillates often cause the mirror to distort the scanned image (not shown in FIG. 1) to a noticeable and undesirable degree. Ideally, the mirror face 24 should be flat at all scanning positions through which the mirror 12 oscillates. But as the mirror 12 oscillates, the torsion arms 16 and 18 twist back and forth, and this twisting induces strain in the arms. Typically, the instantaneous twist-induced strain in the arms 16 and 18 at a particular time depends on, e.g., the oscillation frequency, the rotational position of the arms at that time, and the stiffness of the arms. Furthermore, because the mirror 12 has a non-zero mass, it has a moment of inertia about the axis 26. Consequently, each region on the mirror 12 that does not lie on the axis 26 experiences an acceleration, and thus a force, as the mirror oscillates. The forces at these non-axis regions are often high enough to bend the mirror 12, where the degree of bending at a region typically depends on, e.g., the oscillation frequency, the force at the region, and the stiffness of the mirror. Unfortunately, the twist-induced strain in the torsion arms 16 and 18 and the acceleration-induced bending of the mirror 12 often deform the mirror face 24 such that it is not flat at all scanning positions of the mirror. When the face 24 is not flat, it often reflects the beam 14 in a different direction than it would if it were flat. Unfortunately, this shift in the direction of the reflected beam 14 often alters the pattern through which the mirror 12 sweeps the beam 14, and thus often distorts the scanned image.

SUMMARY OF THE INVENTION

In one embodiment of the invention, a mirror structure includes a mirror, a reflective face, at least one cut disposed in the mirror under the face, and at least one torsion arm attached to the mirror.

Such a mirror structure often distorts a scanned image less than prior mirror structures because the at least one cut uncouples the twist-induced strain in the torsion arm from the mirror face, and thus reduces the level of deformation that this strain imparts to the mirror face.

In another embodiment of the invention, a mirror structure includes a base formed from a first material, a mirror attached to the base, formed from a second material, and having a reflective face, and includes at least one torsion arm attached to the base.

Such a composite mirror structure often distorts a scanned image less than prior mirror structures because it reduces the acceleration-induced bending of the mirror and/or the twist-induced stress in the torsion arm, and thus reduces the level of deformation that this bending and strain impart to the mirror face. In one example, reduced bending of the mirror and/or reduced stress in the torsion arm is/are realized by forming the mirror from a material that is stiffer and less dense than the material from which the base is formed.

BRIEF DESCRIPTION OF THE DRAWINGS

FIGS. 2-4 are front, side, and back views, respectively, of an integral scanning-mirror structure according to an embodiment of the invention.

FIG. 8 is an exploded view of a composite scanning-mirror structure according to an embodiment of the invention.

FIG. 9 is an exploded view of a composite scanning-mirror structure according to another embodiment of the invention.

DESCRIPTION OF THE INVENTION

The following discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 1:
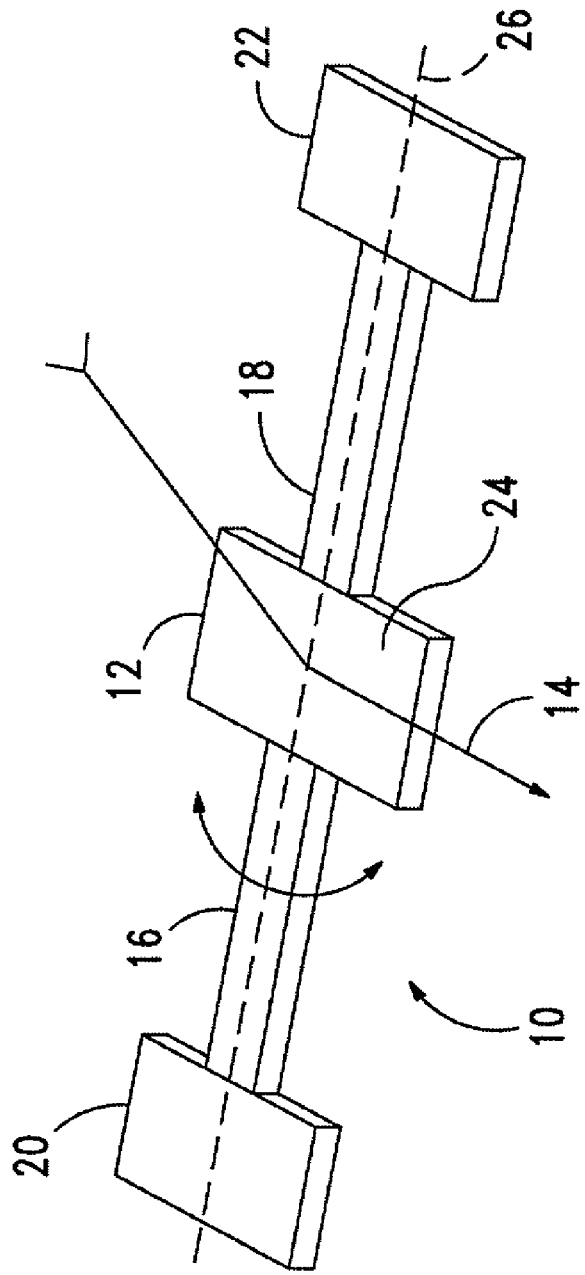
FIG. 1 is a view of a conventional scanning-mirror structure.
Figure 4:
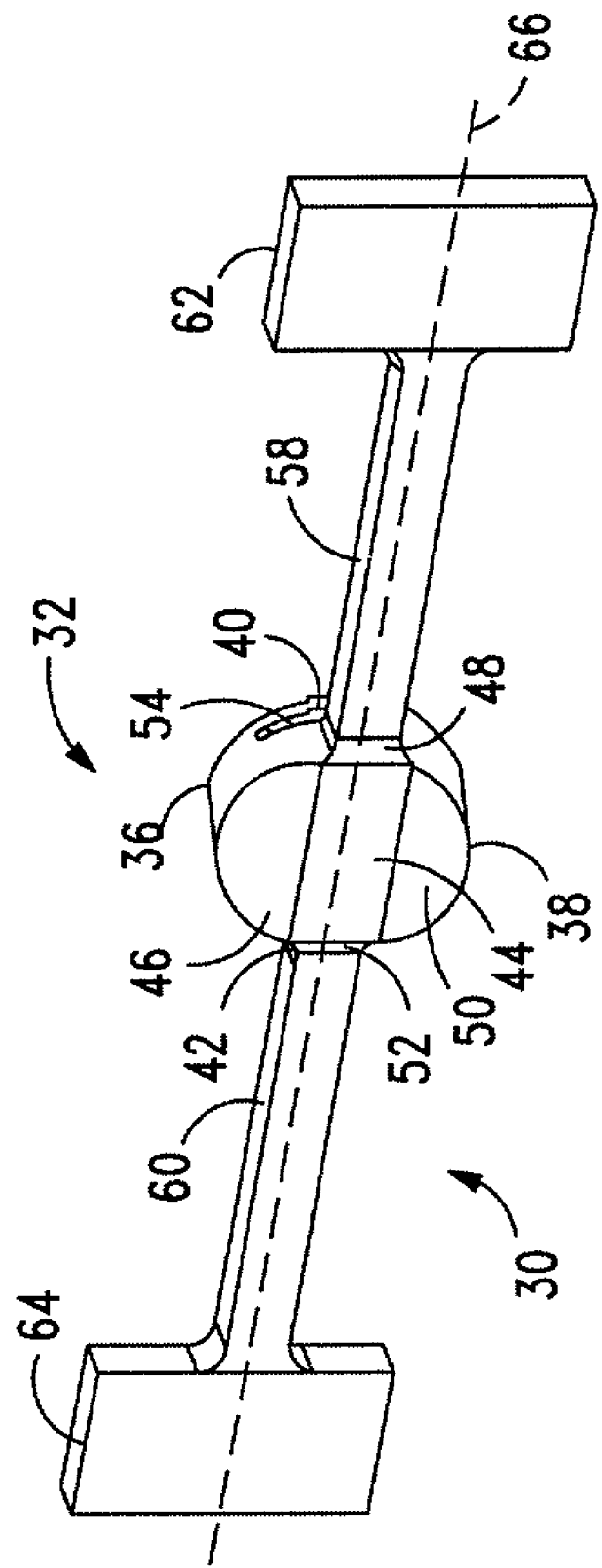

FIGS. 2-4 are front, side, and back views, respectively, of a scanning-mirror structure 30 that, according to an embodiment of the invention, typically distorts a scanned image (not shown) less than prior scanning-mirror structures such as the structure 10 of FIG. 1. The structure 30 includes a mirror 32 having a reflective face 34, elliptically shaped sides 36 and 38, straight sides 40 and 42, a back 44 with chamfered edges 46, 48, 50, and 52, and strain-uncoupling cuts 54 and 56. Typically, the face 34 is polished and coated with an optical coating. The structure 30 also includes torsion arms 58 and 60, which are integrally formed with the mirror 32 along the sides 40 and 42, respectively, and which are spaced from, i.e., are not flush with, the mirror face 34. In addition, the structure 30 includes mounting flanges 62 and 64, which are integrally formed with the torsion arms 58 and 60, respectively.

During operation of the structure 30, the mirror 32 oscillates about an axis 66 to scan an image (not shown) by sweeping an image beam (not shown in FIGS. 2-4) through a raster pattern. Specifically, the flanges 62 and 64 are secured, the mirror 32 is magnetized, and a coil (not shown in FIGS. 2-4) generates a varying magnetic field. In response to the magnetic field, the magnetized mirror 32 sweeps the beam back and forth in a horizontal-scanning dimension while another mirror (not shown) sweeps the beam back and forth in a vertical-scanning dimension. Beam-sweeping and image-scanning techniques are discussed in commonly owned U.S. patent application Ser. No. 09/858,287, entitled "SYSTEM AND METHOD FOR PRODUCING AN IMAGE WITH A SCREEN USING ERASE (OFF) AND IMAGE (ON) LIGHT SOURCES", Ser. No. 09/858,285, entitled "SYSTEM AND METHOD FOR DISPLAYING/PROJECTING A COLOR IMAGE", Ser. No. 09/858,688, entitled "SYSTEM AND METHOD FOR CAPTURING, TRANSMITTING, AND DISPLAYING AN IMAGE", and Ser. No. 09/858,712, entitled "SYSTEM AND METHOD FOR USING MULTIPLE BEAMS TO RESPECTIVELY SCAN MULTIPLE REGIONS OF AN IMAGE", all of which were filed on May 15, 2001, which are incorporated by reference.

The structure 30 has four main features that typically reduce distortion in the scanned image. Two of these features, the elliptically shaped sides 36 and 38 and the chamfered back edges 46 and 48 of the mirror 32, reduce acceleration-induced bending of the mirror's reflective face 34 by reducing the mirror's moment of inertia about the axis 66. The remaining two features, the cuts 54 and 56 and the separation of the torsion arms 58 and 60 from the mirror face 34, reduce the amount of twisting-induced strain that the torsion arms transfer to the face 34. By so reducing the acceleration-induced bending and twisting-induced strain, the mirror face 34 remains flatter as it oscillates through its scanning positions, and thus introduces less of a shift in the direction of the swept image beam. This smaller directional shift translates into less image distortion.

Still referring to FIGS. 2-4, other embodiments of the structure 30 are contemplated. For example, although the disclosed embodiment of the structure 30 includes all four of the main distortion-reduction features—the elliptically shaped sides 36 and 38, the chamfered back edges 46 and 48, the cuts 54 and 56, and the separation of the torsion arms 58 and 60 from the mirror face 34—other embodiments may include any one or any sub-combination of these features. Furthermore, the mirror 32 may include more or fewer cuts 54 and 56, and the cuts may be in different locations. For example, the mirror 32 may include a single cut that is disposed primarily along one of the elliptical sides 36 and 38, or may include a cut that extends around the mirror's entire periphery. In addition, the structure 30 may include a single torsion arm 60, with the side 40 of the mirror including a pin (not shown) that is aligned with the axis 66 and that is supported by a receptacle (not shown) within which the pin is free to rotate. Alternatively, the mirror may include a receptacle (not shown) that receives a support pin (not shown). In such an embodiment, the mirror 32 may include only the cut 56. Moreover, the torsion arms 58 and 60 may not be integral with the mirror 32, and the flanges 62 and 64 may not be integral with the torsion arms.

Figures 5, 6, 7:
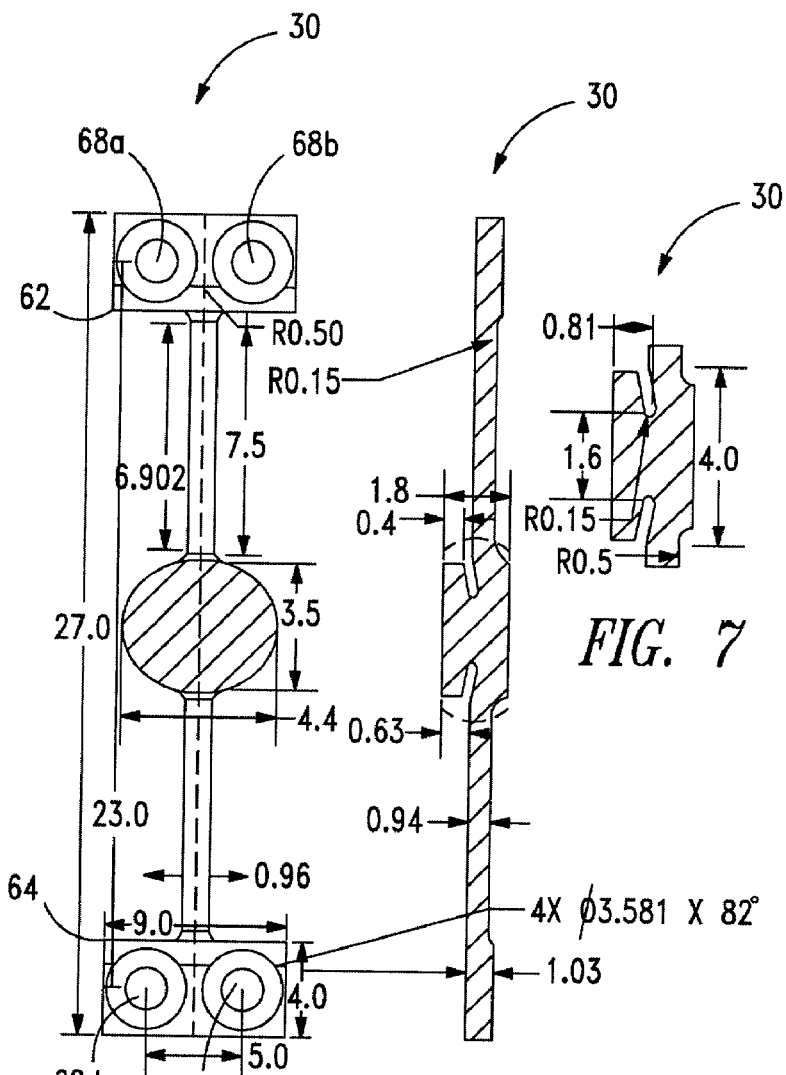
FIGS. 5-7 are plan, side, and magnified-side views, respectively, that show the dimensions of the scanning-mirror structure of FIGS. 2-4 according to an embodiment of the invention.

FIGS. 5-7 are plan, side, and enlarged side views that include the dimensions of the structure 30 of FIGS. 2-4 according to an embodiment of the invention. In one embodiment, the structure 30 includes mounting holes 68a-68d for receiving flat-head mounting screws and/or other fasteners (not shown). Alternatively, one can mount the structure 30 by clamping the mounting flanges 62 and 64 as discussed below in conjunction with FIG. 10. But it has been found that the fasteners often mount the structure 30 more rigidly than clamping.

FIG. 8 is an exploded view of a composite scanning-mirror structure 70 that, according to another embodiment of the invention, typically distorts a scanned image (not shown) less than prior scanning-mirror structures such as the structure 10 of FIG. 1. The structure 70 includes a mirror 72 having a reflective face 74, elliptically shaped sides 76 and 78, straight sides 80 and 82, and swage pins 90 and 92. The structure 70 also includes a base 94 having elliptically shaped sides 96 and 98, straight sides 100 and 102, swage-pin receptacles 104 and 106, and chamfered back edges, only two of which, 108 and 109, are shown. The mirror 72 and base 94 are shaped such that when the pins 90 and 92 engage the receptacles 104 and 106, cuts similar to the cuts 54 and 56 (FIGS. 2-4) are formed between the mirror and the base along the straight sides 80, 82, 100, and 102. The mirror 72 is secured to the base 94 by conventional means such as adhesive or press fitting. The structure 70 further includes torsion arms 110 and 112, which are integrally formed with the base 94 along the sides 100 and 102, respectively, and which are thus spaced from, i.e., are not flush with, the mirror face 74. In addition, the structure 30 includes mounting flanges 114 and 116, which are integrally formed with the torsion arms 110 and 112, respectively. Typically, the mirror 72 is formed from a first material, such as beryllium, that is stiffer and lighter than the magnetic material, such as steel, from which the base 94, torsion arms 110 and 112, and flanges 114 and 116 are formed. Because the mirror 72 is lighter, it has a smaller moment of inertia than the mirror 32 (FIGS. 2-4). Consequently the torsion arms 110 and 112 can be made narrower and/or shorter than the torsion arms 16 and 18 of FIG. 1.

During operation of the structure 70, the mirror 72 oscillates about an axis 118 to scan an image (not shown) by sweeping an image beam (not shown in FIG. 8) through a raster pattern. Specifically, the flanges 114 and 116 are secured, the base 94 is magnetized, and a coil (not shown in FIG. 8) generates a varying magnetic field. In response to the magnetic field, the magnetized base 94 causes the mirror 72 to sweep the beam back and forth in a horizontal-scanning dimension while another mirror (not shown) sweeps the beam back and forth in a vertical-scanning dimension.

In addition to the four main distortion-reducing features discussed above in conjunction with FIGS. 2-4, the mirror structure 70 includes three additional features that typically reduce distortion in the scanned image (not shown). Two features, the material from which the mirror 72 is formed being lighter and stiffer than the material from which the base 94 is formed, reduce acceleration-induced bending of the mirror's face 74 by respectively stiffening the mirror and reducing the mirror's moment of inertia about the axis 118. The remaining feature, the torsion arms 110 and 112 being shorter and narrower, and thus weaker, than the torsion arms 58 and 60 (FIGS. 2-4) reduces the amount of twisting-induced strain in the torsion arms 110 and 112, and thus reduces the amount of twisting-induced strain that the torsion arms transfer to the face 74. By so reducing the acceleration-induced bending and twisting-induced strain, the mirror face 34 remains flatter as it oscillates through its scanning positions, and thus introduces less distortion into the scanned image as discussed above in conjunction with FIGS. 2-4.

Still referring to FIG. 8, other embodiments of the scanning-mirror structure 70 are contemplated. For example, although the disclosed embodiment of the structure 70 includes all seven of the main distortion-reduction features—the elliptically shaped sides, the chamfered edges, the strain-uncoupling cuts, the separation of the torsion arms from the mirror face 34, the lighter and stiffer mirror, and the weaker torsion arms—other embodiments may include any one or any sub-combination of these features. For example, the structure 70 may include no cuts, or one or more cuts may be located in the mirror 72 or the base 94, not between the mirror and the base. Moreover, the torsion arms 110 and 112 may not be integral with the base 94. Other embodiments such as those discussed above in conjunction with FIGS. 2-4 are also contemplated.

FIG. 9 is an exploded view of a scanning-mirror structure 120 that, according to yet another embodiment of the invention, typically distorts a scanned image (not shown) less than prior scanning-mirror structures such as the structure 10 of FIG. 1. The structure 120 is similar to the structure 70 of FIG. 8 except that a mirror 122 includes a male dovetail 124 that engages a female dovetail 126 of a base 128 to secure the mirror to the base.

Figure 10:
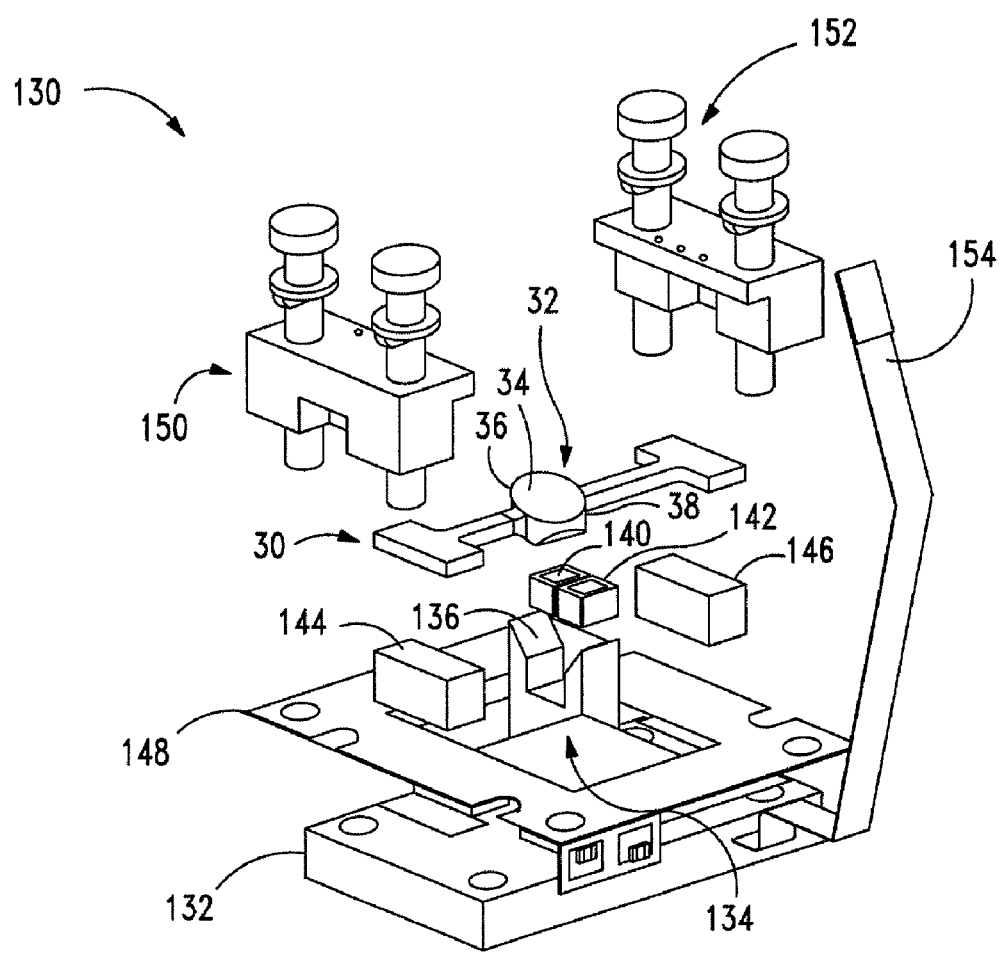
FIG. 10 is an exploded view of a scanner that can incorporate any one of the scanning-mirror structures of FIGS. 2-9, according to an embodiment of the invention.

FIG. 10 is an exploded view of a beam scanner 130 that can incorporate any one of the mirror structures 30 (FIGS. 2-4), 70 (FIG. 8), or 120 (FIG. 9) according to an embodiment of the invention. For purposes of illustration and discussion, the scanner 130 incorporates the mirror structure 30, it being understood that the structure and operation of the scanner is similar when it incorporates one of the other mirror structures 70 and 120. Furthermore, the scanner 130 typically sweeps an image beam (not shown in FIG. 10) in a horizontal-scanning dimension while another mirror (not shown) sweeps the beam in a vertical-scanning dimension, although the scanner can sweep the beam in the vertical-scanning dimension instead of in the horizontal-scanning dimension.

In addition to the mirror structure 30, the beam scanner 130 includes a base 132, a core 134 mounted to the base and having core arms 136 and 138, coils 140 and 142 respectively disposed about the arms 136 and 138, permanent magnets 144 and 146 for magnetizing the mirror structure, a mounting shim 148 disposed between the base and the magnets for securing the scanner within a VRD (FIG. 11), mounts 150 and 152 for securing the mirror structure and magnets, and a flex circuit 154 for making electrical connection to the coils 140 and 142. When assembled, the magnets 144 and 148 support the mirror structure 30 above the core 132 such that the mirror 32 is free to oscillate without contacting the core arms 136 and 138.

In operation, the mirror 32 of the mirror structure 30 scans an image (not shown) by sweeping the image beam (not shown in FIG. 10) in response to magnetic fields in the core arms 136 and 138. Specifically, a beam generator (FIG. 11) directs the image beam onto the face 34 of the mirror 32, and a coil driver (FIG. 11) drives the coils 140 and 142 with respective currents to generate equal but 180°-out-of-phase sinusoidal magnetic fields in the core arms 136 and 138. The sinusoidal magnetic field in the arm 136 attracts the side 36 of the mirror 32, and the sinusoidal magnetic field in the arm 138 attracts the side 38 of the mirror. Because the magnetic fields in the core arms 136 and 138 are 180° out of phase with one another, they reinforce the oscillation of the mirror 32 about the axis 66 (FIGS. 2-4). Typically, the coil driver drives the coils 140 and 142 at or near the resonant frequency of the mirror 32 about the axis 66 such that the coil driver uses little energy to oscillate the mirror. In one embodiment, the mirror structure 30 has the dimensions shown in FIGS. 5-7 and a resonant frequency of approximately 16.8 Kilohertz (KHz), and the coil driver drives each of the coils 140 and 142 at or approximately at 16.8 KHz.

Figure 11:
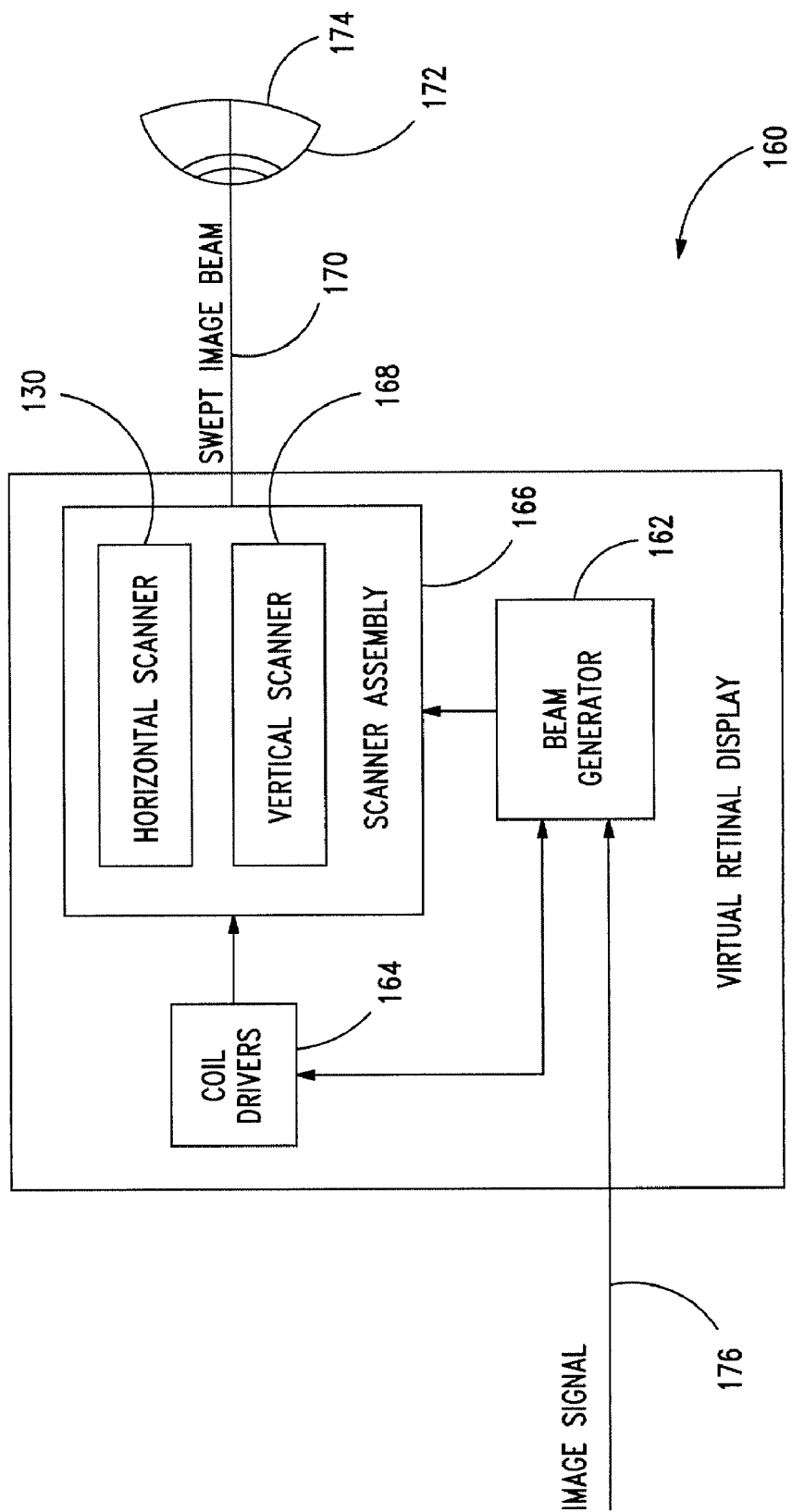
FIG. 11 is a block diagram of a virtual retinal display (VRD) that incorporates the scanner of FIG. 10 according to an embodiment of the invention.

FIG. 11 is a block diagram of a VRD 160 that incorporates the beam scanner 130 of FIG. 10 according to an embodiment of the invention. The VRD 160 includes a beam generator 162, coil drivers 164, and a scanner assembly 166 that includes the scanner 130 and a vertical scanner 168 for respectively horizontally and vertically sweeping an image beam 170. The VRD 160 may be mounted on a helmet (not shown) such that it can scan an image directly into a viewer's eye 172 and onto a viewer's retina 174. The VRD 160 may include a second scanner assembly (not shown) for scanning the image into the viewer's other eye (not shown), or may include a beam splitter (not shown) for splitting the beam 170 into two identical beams, one beam for each eye.

In operation, the VRD 160 generates the image beam 170 from an image signal 176 and scans an image (not shown) onto the viewer's retina 174 by horizontally and vertically sweeping the beam into the viewer's eye 172. The beam generator 162 receives the image signal 176 and converts it into the image beam 170. For example, if the signal 176 is an electronic signal, the generator 162 converts this electronic signal directly or indirectly into the image beam 170, which is typically an optical beam. Alternatively, the image signal 176 may be an optical image signal that the generator 162 merely directs toward the scanning assembly as the image beam 170. The coil drivers 164 drive the coils (FIG. 10) of the scanners 130 and 168 at the desired horizontal and vertical sweep frequencies, respectively. Typically, the image signal 176 includes synchronization data with which the generator 162 synchronizes the coil drivers 164 such that the scanners 130 and 168 begin each horizontal and vertical sweep, respectively, at the appropriate time. Alternatively, other synchronization techniques can be used, such as those discussed in commonly owned U.S. patent application Ser. No. 09/858,287, entitled "SYSTEM AND METHOD FOR PRODUCING AN IMAGE WITH A SCREEN USING ERASE (OFF) AND IMAGE (ON) LIGHT SOURCES", Ser. No. 09/858,285, entitled "SYSTEM AND METHOD FOR DISPLAYING/PROJECTING A COLOR IMAGE", Ser. No. 09/858,688, entitled "SYSTEM AND METHOD FOR CAPTURING, TRANSMITTING, AND DISPLAYING AN IMAGE", and Ser. No. 09/858,712, entitled "SYSTEM AND METHOD FOR USING MULTIPLE BEAMS TO RESPECTIVELY SCAN MULTIPLE REGIONS OF AN IMAGE", all of which were filed on May 15, 2001, which are incorporated by reference. The synchronized scanners 130 and 168 horizontally and vertically sweep the image beam 170 through a raster pattern to scan the image onto the viewer's retina 174. If the VRD 160 includes another scanner assembly, it operates in a similar fashion to scan a second image beam (not shown), which is similar to the image beam 170, onto the viewer's other retina (not shown).

I claim:

1. A mirror structure, comprising:
    a mirror having a reflective face and a side;
    a first torsion arm attached to the side of the mirror; and
    a first cut disposed on the side between the reflective face and the first torsion arm.

2. The mirror structure of claim 1 wherein:
    the first cut is disposed on the side of the mirror and extends along the side in a direction that is parallel to the face of the mirror.

3. The mirror structure of claim 1, further comprising:
    wherein the mirror comprises first and second opposite sides, the first cut is disposed on the first side of the mirror, and the mirror comprises a second cut disposed under the face along the second side of the mirror;
    wherein the first torsion arm is attached to the first side of the mirror; and
    a second torsion arm attached to the second side of the mirror.

4. The mirror structure of claim 1 wherein the mirror comprises a back having a chamfered edge.

5. The mirror structure of claim 1 wherein the mirror has first and second opposite sides that have respective portions that are shaped like a portion of an ellipse.

6. The mirror structure of claim 1 wherein:
    the mirror has first and second adjacent sides; and
    the first cut is disposed on the first and second sides.

7. The mirror structure of claim 1, further comprising:
    wherein the first torsion arm has a first end that is attached to the mirror and a second end that is opposite the first end; and
    a mounting flange attached to the second end of the first torsion arm.

8. The mirror structure of claim 1 where in the mirror and the first torsion arm are formed from a magnetic material.

9. A mirror structure, comprising:
    a mirror having a reflective face and a side, and a first cut disposed on the side; and
    a first torsion arm attached to the side of the mirror perpendicularly spaced from the face of the mirror;
    wherein-the cut is disposed on the side of the mirror between the face of the mirror and the first torsion arm.

* * * * *